July 24, 1962　　　E. EBBINGHAUS　　　3,045,474

GAS ANALYSER

Filed July 1, 1959

GAS ANALYSER

Edgar Ebbinghaus, Marl, Kreis Recklinghausen, Germany, assignor to Hartmann & Braun Aktiengesellschaft, Frankfurt am Main, Germany, a corporation of Germany
Filed July 1, 1959, Ser. No. 824,435
3 Claims. (Cl. 73—27)

The invention relates to an improved construction of gas analysers for measuring the constituents with paramagnetic susceptibility, especially of oxygen, in the gas under test. The invention refers to a special design of so-called "magnetic oxygen testers" whose analysis cell consists of a small tube surrounded by a heating winding, the ends of the tube being connected to a divided lead carrying the gas under test and the tube with the heating winding being arranged in an inhomogeneous magnetic field.

The invention provides for an improved design of such analysers and especially has the purpose of creating means of adjustment for suppressing the zero point in such a way that the deviation of the oxygen content in the gas under test from an adjusted value can be measured.

Figure 1:
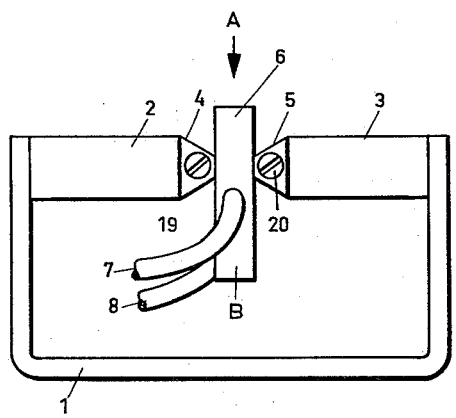
Figure 2:
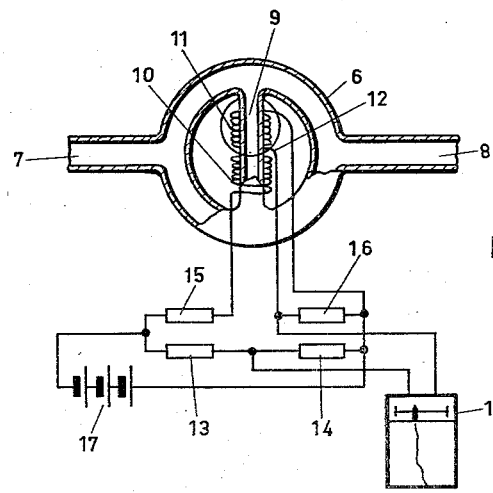

A full description of the invention is given below. FIGS. 1 and 2 show an arrangement for measuring the oxygen content of gases with the improved design of the invention, these improvements being shown in FIG. 1 and especially in FIGS. 3 and 4.

FIG. 1 shows a permanent magnet 1 the poles of which are fitted with soft iron pole pieces 2 and 3. In general the pole pieces are of cylindrical shape and the ends 4 and 5 facing each other have the shape of a truncated cone. Between the two inner ends of the pole pieces the analysis cell consisting of parts 6 and 9 is inserted with gas supply lead 7 and gas discharge lead 8. A more detailed illustration of the analysis cell is given in FIG. 2. This is a cross-sectional drawing along the line A—B of FIG. 1. One part of the analysis cell is ring-shaped, the gas supply lead 7 and lead 8 for the gas discharge are arranged on a diameter opposite to each other. On another horizontal diameter of the annular cell 6 the connection vertical conduit 9 is provided connecting two opposite points of annular cell 6. Connection conduit 9 is surrounded by a split heating winding having lower and upper coils 10 and 11. Both parts of heating winding 10 and 11 are connected with each other at point 12 and arranged in a bridge circuit with the two resistors 13 and 14. In this bridge circuit the two resistors 15 and 16 are disposed for the purpose of adjustment, one resistance being connected in series to one part of the heating winding, whereas the other is arranged in parallel to the second part of the heating winding. This bridge is fed by current source 17, the diagonal voltage being indicated or recorded by an indicator or recorder 18. FIG. 1 shows that the measuring cell is inserted between the two ends 4 and 5 of pole pieces 2 and 3 in such a manner that an inhomogeneous magnetic field is produced in the region of the upper coil 11 within the connection 9. This inhomogeneous field causes in conjunction with the heating up due to the heating windings a downward flow in the presence of a paramagnetic gas, a so-called magnetic wind producing an unequal cooling of the two parts 10 and 11 of the heating winding. This unequal cooling of the heating winding causes a change of resistance in windings 10 and 11 and consequently an unbalance of the bridge which is indicated by instrument 18 and represents a measure for the content of paramagnetic gases contained in the gas under test.

Figure 4:
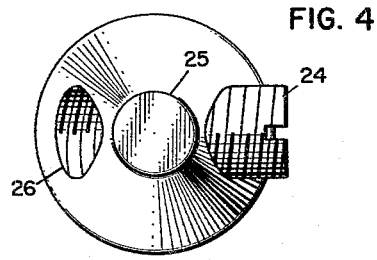
Figure 3:
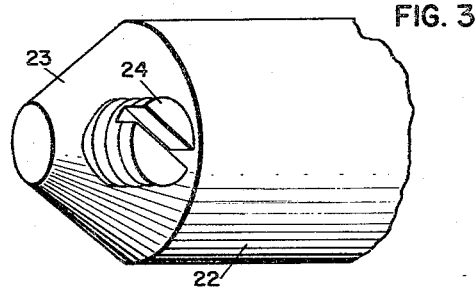

However due to the heating of the gas under test in conduit 9 a pressure drop from bottom to top independent from the magnetic wind and consequently a flow with upward direction is produced, an effect which is known from chimneys. The upward pressure drop and the differential pressure produced by the magnetic effect in the heated oxygen counteract each other. Therefore, if the gas under test does not contain paramagnetic constituents, i.e. oxygen, the upward differential pressure caused by the heating of the gas or by the chimney effect respectively will become higher and produces an upward flow. This also applies if the gas under test contains one component with paramagnetic susceptibility even if this content of paramagnetic constituents (oxygen) is very small. With increased content of paramagnetic constituents the effect of the inhomogeneous magnetic field on the heated oxygen becomes predominant at a certain value and a downward flow is produced causing an unequal cooling of the two halves 10 and 11 of the heating winding, thus representing a measure for the content of paramagnetic consituents in the gas under test. At a definite content of oxygen the effect of the inhomogeneous magnetic field on the heated gas equals the "chimney effect" in tube 9, thus preventing a flow and the heating wire bridge is balanced. The shown arrangement of the bridge may be balanced when the gas under test contains a certain amount of paramagnetic constituents, preferably oxygen, for the construction described enables oxygen measurements with suppressed zero. The degree of zero suppression can be adjusted as suggested by the inventor by changing the inhomogeneous magnetic field acting on the gas in tube 9 of the measuring cell. For this purpose one of the two pole pieces of magnet 1 (FIG. 1) is fitted with a boring, however it is also possible to provide borings for both pole pieces 2 and 3 as shown in FIG. 1. A soft iron pin or screw can be inserted or screwed into the borings more or less. These threaded pins are shown at 19 and 20 of FIG. 1. FIG. 3 is a partial view of one of the pole pieces. The conical part 23 adjacent to the cylindrical part 22 is provided with a boring. This boring has a thread for inserting screw 19 more or less. FIG. 4 gives a front view of the pole piece, circle 25 representing the frontal area of the pole piece. Slightly more than half the length of screw 24 is screwed into the boring and the opening not closed by the screw is designated with 26. When removing the threaded pin or screw 24 from the boring of the pole piece, at the most narrow parts of the remaining cross section of the soft iron pole piece a saturation is produced limiting the magnetic field between the two ends of the pole pieces. The magnetic field produced in the measuring cell between the two opposite ends of the pole pieces can be adjusted with great sensitivity by inserting the soft iron pin partially or completely because the effective iron cross section of the pole piece is increased. Setting of the pin enables a sensitive adjustment of the point where the upward differential pressure due to the heating of the gas and the downward differential pressure due to the effect of the inhomogeneous magnetic field on the paramagnetic constituents equal with each other. While FIG. 2 shows the structural gas flow system between inlet and outlet 7 and 8 symmetrical with respect to the horizontal, this symmetry can be varied by well-known means (not shown) to reduce or induce a tendency for the gas in the vertical tube 9 to flow either upwardly or downwardly. A tendency to flow upwardly or downwardly appears as an increase or decrease of the chimney effect to be opposed by the magnetic effect. Advantage of this increase or decrease is taken to vary the oxygen content range of the instrument for a nearly balanced condition of the bridge. Thus for, say, an exactly 20% oxygen content in the gas passing through the instrument at a constant rate, the flow through a quadrant of the torus may be impeded to balance the bridge roughly. By choosing different effective dimensions of the annular ring and the diametric tube 9, the cell characteristics can be changed so that the bridge of fixed resistors 15, 16, 17 and 18 can be balanced at various oxygen concentrations from 20% to 90%. With a given set of cell dimensions which may approximately enable balance of the bridge at a desired oxygen content, the bridge may then be accurately balanced by adjustment of the screw plug 24 for such a content.

I claim:

1. In a gas analysis cell, a line for carrying gas under test and provided with upper and lower branches for partial flow in each; a vertical tube in gaseous flow communication with the two branches; upper and lower heating coils on the tube and of temperature sensitive resistance wire; a bridge circuit including said coils as adjacent arms; means for feeding the bridge; and for measuring imbalance of the bridge; a magnet having opposed pole pieces with the upper portion of the tube between the latter for producing an inhomogeneous field in the tube, at least one of the pole pieces being provided with a bore axially substantially at right angles to the flux in the magnet; and a soft iron plug snugly fitting in the bore for reception in the bore at a variable depth to adjust the magnetic cross sectional area of the pole piece.

2. In a gas analysis cell, a vertically disposed tube having upper and lower heating coils thereon; means for symmetrically conducting test gas to and from upper and lower end portions of the tube with substantially equal pressure at said portions; a bridge including the respective coils as parallel branches; means for conducting test gas to upper and lower ends of the tube; a magnet having opposed pole pieces for producing an inhomogeneous field in the tube in the region of the upper coil, the tube being between the pieces; at least one of the pole pieces having a bore axially substantially perpendicular to the direction of the magnetic flux, and a soft iron plug accurately threaded into said bore for rotation for varying the depth of entry into the pole piece for varying the magnetic cross sectional area of the pole piece.

3. In a gas analysis cell, a line for carrying gas under test and provided with upper and lower branches for partial flow in each; a vertical tube in gaseous flow communication with the two branches; upper and lower heating coils on the tube and of temperature sensitive resistance wire; a bridge circuit including said coils as adjacent arms; means for feeding the bridge; and for measuring imbalance of the bridge; a magnet having opposed pole pieces with the tube between the latter for producing an inhomogeneous field in the tube at the zone within the upper coil, at least one of the pole pieces being provided with an internally threaded bore axially substantially at right angles to the flux in the magnet, and a soft iron plug accurately threaded into said bore for rotation for varying the depth of entry into the pole piece for varying the magnetic cross sectional area of the pole piece.

References Cited in the file of this patent
UNITED STATES PATENTS

| | | |
|---|---|---|
| 2,144,546 | Reese et al. | Jan. 17, 1939 |
| 2,603,965 | Medlock | July 22, 1952 |
| 2,763,151 | Richardson | Sept. 18, 1956 |
| 2,807,159 | Wilson | Sept. 24, 1957 |
| 2,882,719 | Greene et al. | Apr. 21, 1959 |